Feb. 29, 1944.    R. J. SHERMAN    2,343,088
UNIVERSAL MATERIAL WORKING FIXTURE
Filed Sept. 5, 1941
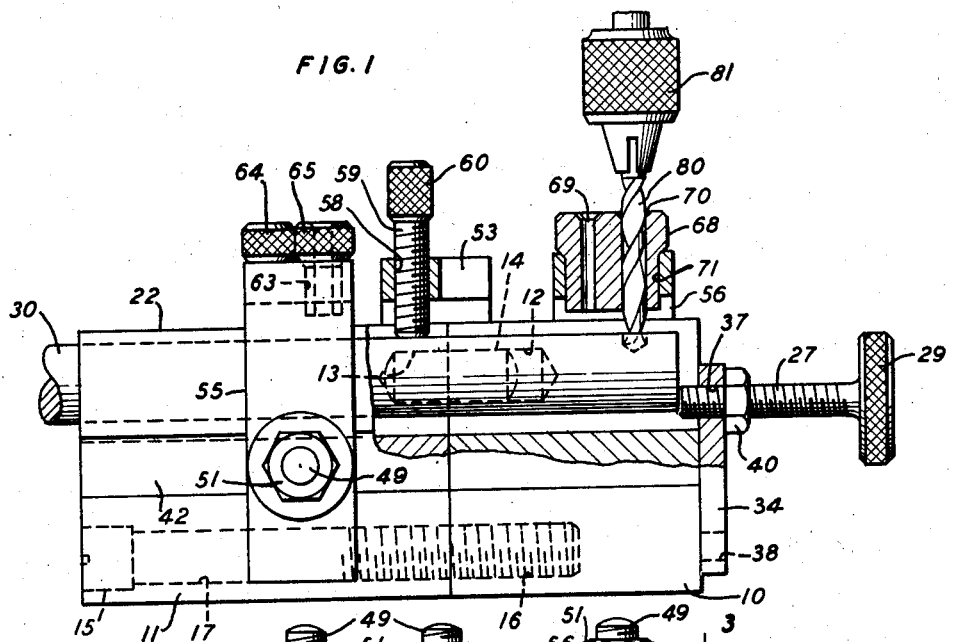
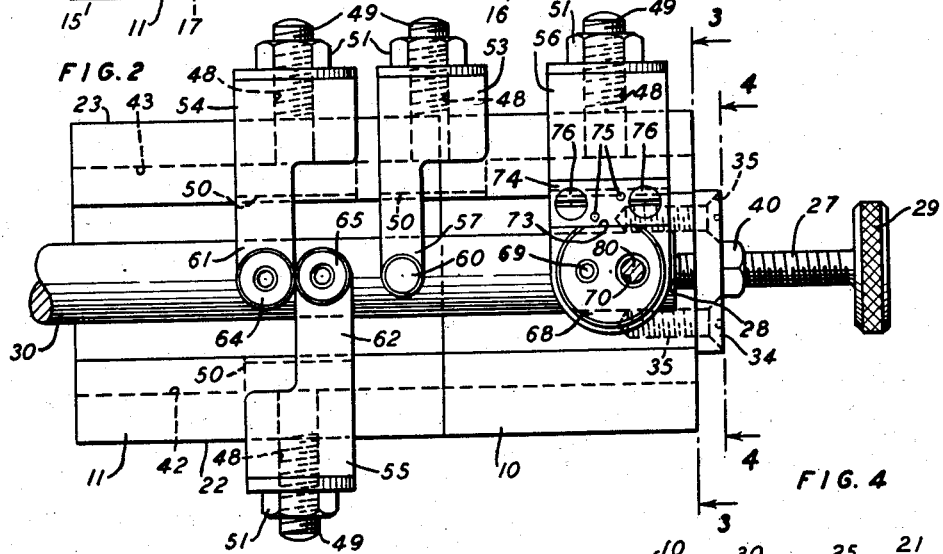
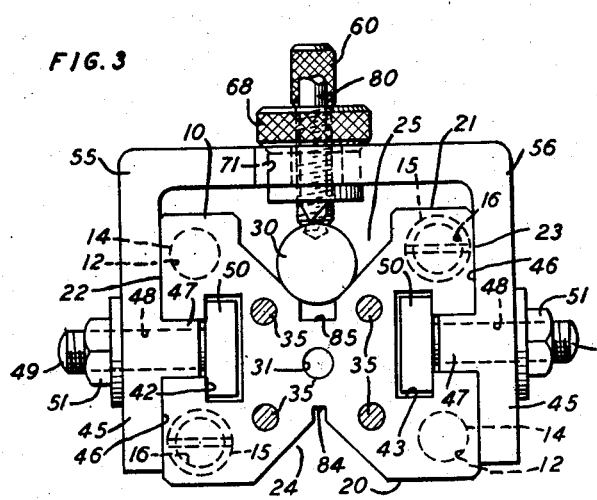
INVENTOR
R. J. SHERMAN
BY
E. R. Nowlan
ATTORNEY Patented Feb. 29, 1944

2,343,088

UNITED STATES PATENT OFFICE 2,343,088

UNIVERSAL MATERIAL WORKING FIXTURE

Russel J. Sherman, Rutherford, N. J., assignor to Western Electric Company, Incorporated, New York, N. Y., a corporation of New York Application September 5, 1941, Serial No. 409,643

5 Claims. (Cl. 77—62)

This invention relates to universal material working fixture, and more particularly to universal fixtures for use in drilling round stock.

With flat stock or stock having at least one flat surface upon which it may rest, it is possible without much apparent difficulty to accurately perform operations thereon. However, the performing of operations on round stock presents added problems which are difficult to solve with any degree of accuracy, due to the fact that a supporting flat surface naturally does not exist in the round stock.

An object of the invention is to provide a universal material working fixture which is highly variable and precisely accurate.

With this and other objects in view, the invention comprises a universal material working fixture particularly for drilling or otherwise working round stock wherein joint V-block sections have accurately aligned slots parallel with the V-grooves of the block, a locating screw serving to locate stock in either one of the V-grooves while a set screw carried by a variable slide holds the stock in place, bushing supports associated with the slots serving, when accurately located, to guide tools in performing work accurately in the stock.

Other objects and advantages will be apparent from the following detailed description when taken in conjunction with the accompanying drawing, wherein Fig. 1 is a side elevational view of the universal material working fixture, portions thereof being shown in section;

Fig. 2 is a top plan view of the fixture;

Fig. 3 is an end elevational view taken along the line 3—3 of Fig. 2, and

Fig. 4 is an end elevational view taken along the line 4—4 of Fig. 2.

Referring now to the drawing, the universal material working fixture illustrated therein is formed of companion V-blocks 10 and 11. The V-block 10, being in the present embodiment the main V-block, other V-blocks, such as the V-block 11, of varying lengths depending upon the desired length for the completed structure, are secured to the main V-block. The V-blocks 10 and 11 are identical in cross-section, their variations lying in their length and other structures provided for the securing of the blocks together. The securing means consists of accurately aligned apertures 12 and 13 in the blocks 10 and 11, respectively, to receive dowel-pins 14 therein. These apertures, as illustrated in Fig. 3, are at diagonally opposite corners, apertures being provided in the remaining corners of the blocks for receiving screws 15 cooperating with the dowel-pins to secure the blocks together. It will be apparent, by viewing Fig. 1, that threaded apertures 16 are provided in the main block 10 for the screws 15, aligned apertures 17 being provided in the block 11 through which the screws may pass.

The blocks 10 and 11 have bottom and top surfaces 20 and 21 respectively which are machined truly parallel with each other, side surfaces 22 and 23 of the blocks being also machined truly parallel with each other and truly perpendicular to the bottom and top surfaces. V-grooves 24 and 25 are machined in the bottom and top portions of the blocks, these grooves varying in size, as illustrated in Fig. 3, to accommodate stock of different diameters, their center lines, however, lying in a common plane parallel with the side surfaces 22 and 23 and an equal distance from each side surface.

A locating screw 27, having an accurately machined end 28 and an accurately machined head 29, is employed to locate stock, such as that illustrated at 30, in either of the V-grooves 24 or 25. If it is desirable to perform work on stock some distance from the end of the stock, the screw 27 may be disposed in a threaded aperture 31 formed in the outer end of the block 10 with its center line lying in the plane of the grooves 24 and 25, the inner surface of the head 29 serving as a locating means for stock which may extend beyond the end of the block 10. If, however, some of the work is to be performed on the stock adjacent the end thereof and other work is to be performed at spaced distances therefrom, a locating plate 34, having truly machined surfaces, is secured to the end of the block 10 through the aid of screws 35. In the plate 34 threaded apertures 37 and 38 are disposed, the center lines of these apertures lying in the plane of the grooves 24 and 25 and near the inner extremities of the grooves. The locating screw 27 is disposed in the aperture 37 when the stock to be worked is disposed in the groove 25, the aperture 38 being employed when the stock is disposed in the groove 24. It is apparent that, if desired, the stock may be located in the fixture without the aid of the screw 27 when the work to be performed on the stock is spaced a sufficient distance from the end of the stock to allow for the measurements to be taken from the locating plate 34. Whenever the adjusting screw is to be used a lock nut 40 is employed to lock the screw in any desired position, to prevent subsequent use of the fixture or the placing of stock thereagainst from jarring the screw loose and varying its adjustment.

T-shaped slots 42 and 43 are machined in the sides of the blocks in true alignment in each block, these grooves having their center lines in a common plane at the center of the blocks.

A plurality of inverted L-shaped supports is provided for connection with the V-blocks. In general these supports are identical in structure, their differences lying in the varying contours of their upper ends which extend over the center line of the grooves 24 and 25. They each have vertical portions 45, inner surfaces 46 of which are machined true and lie flush with either side surface 22 or 23, depending upon which side of the block the supports are to be mounted. Projections 47 are formed integral with the supports, these projections being equal in width to the width of the supports and with vertical dimensions such that there will be sliding fit in their respective T-slots 42 or 43. These projections, therefore, cooperate with the engaging walls of the T-slots to assure truly perpendicular positioning of the supports regardless of their location with respect to the V-blocks 10 and 11. The supports including the projections 47 are apertured at 48 to receive bolts 49, heads 50 of which are movably disposed in the inner portions of the T-slots and engage surfaces thereof to cooperate with the nuts 51 of the bolts to rigidly secure the supports in any selected position with respect to the V-blocks.

In the illustration four supports, identified by reference numerals 53, 54, 55 and 56 (Fig. 2), are illustrated. The support 53 has a reduced portion 57 in the end of which is provided a threaded aperture 58, the center line of this aperture lying in the plane of the centers of the V-grooves 24 and 25. A holding screw 59 is disposed in the aperture 58 and provided with a knurled head 60 for use in rotating the screw into engagement with the stock 30, to secure the stock in position after it has been located in the blocks through the aid of the plate 34 or the screw 27.

The supports 54 and 55 have similarly reduced portions 61 and 62 respectively, the ends of these portions being apertured, as at 63 (Fig. 1), the center lines of these apertures lying in the plane of the centers of the grooves 24 and 25. Tool guiding bushings 64 and 65 are removably disposed in the apertures 63 of the supports 54 and 55. As illustrated, the reduced portions 61 and 62 as well as the reduced portion 57 permit close positioning of the bushings, allowing also sufficient structure in the supports for the mounting thereof on the V-blocks. The supports 54 and 55 are identical in structure and by locating the reduced portions at different sides of the blocks, the supports may be disposed with their reduced portions in what might be termed lapping positions, as shown in Fig. 2. There is a limit, however, as to how close work may be performed on the stock with the use of separate bushings and separate supports. In such a case a bushing, as indicated at 68, provided with two or more tool guiding apertures 69 and 70, is provided for mounting in one support, this support in the present instance being the support 56. The support 56 is apertured, as at 71 (Fig. 1), to receive the bushing 68, it being important, however, that the tool guiding apertures 69 and 70 of this bushing not only be located in accurate alignment with respect to the stock but be maintained in alignment during working operations. This is assured by the provision of a machined flat surface 73 on the outer head of the bushing 68, which surface is parallel with a plane common to the center lines of the apertures 69 and 70 and cooperates with a locating block 74, the latter being accurately located through the aid of dowel-pins 75 on the support 56 and secured in place by screws 76.

In setting up the fixture for use the operator first determines which groove, 24 or 25, he wishes to employ, this being determined from the size of the stock which is to be worked. For the purpose of illustration, let it be assumed that the groove 25 has been selected and that the stock is of the size represented by the stock 30 illustrated in the drawing. In the present illustration holes are to be drilled in this stock, these holes to be positioned relative to the end thereof, so that it is more desirable to employ the locating screw 27. After the screw 27 has been located and locked in position by the nut 40 a suitable precision instrument is employed to locate the positions of the holes to be drilled in the stock and to mainly locate the positions of the bushings 64, 65 and 68 and their supports 54, 55 and 56 respectively. The sides of the V-blocks upon which the supports are to be mounted depend upon the arrangement of the holes which are to be drilled in the stock. The support 53 may be mounted upon either side of the blocks, it being immaterial in the present instance upon which side this support is mounted. It is preferable, however, to mount the support 53 at a point between the group of holes to be drilled in the stock, so as to position the holding means near the center of the group.

The bolts 49 of the supports need not be removed therefrom, it being required merely that they be loosened so that the supports may be slid into whichever slot, 42 or 43, they are to be disposed. Once the supports are located they are locked in place through the aid of the bolts by the tightening of the nuts 51. The stock may then be disposed in place, the end thereof located against the end 28 of the screw, at which time the holding screw 59 is turned to secure the stock against displacement.

Suitable bushings depending upon the size of the drill used for the hole to be drilled in the stock at their respective positions, are disposed in the proper supports. After this the fixture may be disposed upon a work supporting table or plate of a drill press and a drill, such as drill 80, disposed in a chuck 81 of the drill press may be moved downwardly through its respective bushing to drill the hole in or through the stock. Attention is directed to slots 84 and 85, at the inner extremities of the V-grooves 24 and 25 respectively, which vary in size to allow drills of various sizes to pass therein after travelling through the stock.

This operation may be continued for the different bushings or the different bushing holes, there being two provided in the bushing 68, until all of the holes have been drilled in the stock.

With the true machining of the surfaces 22 and 23 and the accurate forming of the supports 53 to 56 inclusive or other like supports of whatever number might be desired, it is possible, by securing the supports in place and drawing them tightly against the side surfaces of the blocks, to accurately position the bushings or whatever is held by the upper ends thereof in true alignment with the center lines of the grooves 24 and 25. Therefore, the holes drilled in the stock will have their centers lying accurately in a common plane and truly parallel one with the other. Furthermore, this accurate positioning of the bushings will prevent walking of the drills. The bushings, once located with respect to the blocks, are held against movement during the drilling operation due to the fact that they are locked in place and held against movement relative to the blocks through mis-alignment of the drill with the bushing, jarring of the support during handling of the fixture after the adjustments have been made, or from any other causes which might exist.

The present embodiment illustrates the fixture particularly adapted for use in drilling holes in round stock but it could readily be used for boring, tapping, reaming, burring and other material working operations.

Therefore, the embodiment of the invention herein disclosed is merely illustrative and may be widely modified and departed from in many ways without departing from the spirit and scope of the invention as pointed out in and limited solely by the appended claims.

What is claimed is:

1. A universal material working fixture comprising a V-block having parallel side surfaces with longitudinal slots therein and a longitudinal V-groove having a center line in a plane parallel with the side surfaces and slots and disposed midway therebetween, a tool guiding bushing, an F-shaped support therefor having integral portions, one extending over the V-groove and apertured to receive the bushing, another extending at right angles from the first and positionable in engagement with either side surface to position the center of the bushing in the said plane, and also another portion formed for a close but slidable fit in either slot, and means adapted to secure the support in place at either side surface.

2. A universal material working fixture comprising a V-block having parallel side surfaces with longitudinal slots therein and a longitudinal V-groove having a center line in a plane parallel with the side surfaces and slots and disposed midway therebetween, tool guiding bushings, like supports therefor each having a portion of a given width positionable in engagement with either side surface, another portion integral with the first portion formed for close but slidable fit in either slot, and also a narrow portion integral with the first portion and apertured to receive its bushing, the narrow portions facilitating disposing of the bushings at closely adjacent positions, and means adapted to secure the supports in place.

3. A universal material working fixture comprising a V-block having parallel side surfaces with longitudinal slots therein and a longitudinal V-groove having a center line in a plane parallel with the side surfaces and slots and disposed midway therebetween, tool guiding bushings, and like supports with integral portions for interfitting engagement with either slot and reduced portions formed to receive the bushings and position the bushings of opposing supports in abutting engagement with each other, and means adapted to secure the supports in place.

4. A universal material working fixture comprising a V-block having parallel side surfaces with longitudinal slots therein and a longitudinal V-groove having a center line in a plane parallel with the side surfaces and slots and disposed midway therebetween, tool guiding bushings, and like supports with intgeral portions for interfitting engagement with either slot and reduced portions formed to receive the bushings and position the bushings of opposing supports adjacent each other, means adapted to secure the supports in place, a member to hold work in the V-groove, and a support therefor substantially identical to the bushing supports and adapted for interfitting engagement with either slot.

5. A universal material working fixture comprising a V-block having parallel side surfaces with longitudinal slots therein and opposing longitudinal V-grooves in intermediate surfaces with center lines in a plane parallel with the side surfaces and slots and disposed midway therebetween, tool guiding bushings, angular supports for the bushings adapted for adjustable movement on either side surface to centrally position their bushings at any desired position over either V-groove and having portions for slidable engagement in either slot, and means adapted to secure the supports at any of the adjustable positions.

RUSSEL J. SHERMAN.